United States Patent
Chen (10) Patent No.: US 11,991,618 B2
(45) Date of Patent: May 21, 2024

(54) ACCESS CONTROL METHOD, TERMINAL, AND NETWORK SIDE DEVICE

(71) Applicant: VIVO MOBILE COMMUNICATION CO., LTD., Guangdong (CN)

(72) Inventor: Li Chen, Dongguan (CN)

(73) Assignee: VIVO MOBILE COMMUNICATION CO., LTD., Dongguan (CN)

(*) Notice: Subject to any disclaimer, the term of this patent is extended or adjusted under 35 U.S.C. 154(b) by 431 days.

(21) Appl. No.: 17/213,795

(22) Filed: Mar. 26, 2021

(65) Prior Publication Data
US 2021/0219209 A1    Jul. 15, 2021

Related U.S. Application Data

(63) Continuation of application No. PCT/CN2019/104854, filed on Sep. 9, 2019.

(30) Foreign Application Priority Data

Sep. 27, 2018    (CN) .......................... 201811134412.9

(51) Int. Cl.
*H04W 48/02* (2009.01)
*H04W 36/36* (2009.01)
(Continued)

(52) U.S. Cl.
CPC ........... *H04W 48/10* (2013.01); *H04W 48/02* (2013.01); *H04W 48/16* (2013.01); *H04W 52/0209* (2013.01)

(58) Field of Classification Search
CPC ..... H04W 48/10; H04W 48/02; H04W 48/16; H04W 48/12; H04W 52/0209; H04W 36/36
See application file for complete search history.

(56) References Cited

U.S. PATENT DOCUMENTS 10,271,247 B2 *  4/2019  Jung ....................... H04W 8/00
11,229,005 B2 *  1/2022  Wu ........................ H04W 48/16
(Continued)

FOREIGN PATENT DOCUMENTS

CN    105519188 A    4/2016
CN    106612547 A    5/2017
(Continued)

OTHER PUBLICATIONS

International Search Report and Written Opinion of the International Searching Authority regarding International Patent Application No. PCT/CN2019/104854, dated Nov. 27, 2019. Translation provided by Bohui Intellectual Property.
(Continued)

*Primary Examiner* — Khawar Iqbal
(74) *Attorney, Agent, or Firm* — Harness, Dickey & Pierce, P.L.C.

(57) ABSTRACT

An access control method includes: receiving network side access association information sent by a network side, wherein the network side access association information includes first information, and the first information indicates a bandwidth of an initial bandwidth part of a target cell, or a bandwidth of a default bandwidth part, or a bandwidth of a first activated bandwidth part; and when the terminal does not support the bandwidth of the initial bandwidth part, or the bandwidth of the default bandwidth part, or the bandwidth of the first activated bandwidth part, performing access control processing on the target cell according to the network side access association information.

17 Claims, 4 Drawing Sheets

(51) Int. Cl.
*H04W 48/10* (2009.01)
*H04W 48/16* (2009.01)
*H04W 52/02* (2009.01)

(56) References Cited

U.S. PATENT DOCUMENTS

| | | | | |
|---|---|---|---|---|
| 11,540,255 | B2* | 12/2022 | Shen | H04W 72/20 |
| 11,546,104 | B2* | 1/2023 | Wang | H04L 5/0053 |
| 2019/0037338 | A1* | 1/2019 | Edge | H04W 4/02 |
| 2019/0074886 | A1* | 3/2019 | Yoon | H04B 17/318 |
| 2019/0230499 | A1* | 7/2019 | Sun | H04W 24/08 |
| 2019/0281489 | A1 | 9/2019 | Hong | |
| 2020/0221348 | A1* | 7/2020 | Lim | H04W 72/0446 |
| 2020/0267704 | A1* | 8/2020 | Li | H04W 48/12 |
| 2020/0280894 | A1 | 9/2020 | Koskinen et al. | |
| 2020/0367229 | A1* | 11/2020 | Shen | H04W 72/20 |
| 2020/0374767 | A1* | 11/2020 | Kuang | H04W 36/0072 |
| 2021/0014736 | A1* | 1/2021 | Zhang | H04L 5/0092 |
| 2021/0076445 | A1* | 3/2021 | Tsai | H04L 5/003 |
| 2021/0083730 | A1* | 3/2021 | Hwang | H04L 5/0092 |

FOREIGN PATENT DOCUMENTS

| | | |
|---|---|---|
| CN | 106664191 A | 5/2017 |
| CN | 106954238 A | 7/2017 |
| CN | 107734593 A | 2/2018 |
| CN | 108243630 A | 7/2018 |
| CN | 109215978 A | 1/2019 |
| WO | WO-2012130024 A1 | 10/2012 |
| WO | WO-2018028428 A1 * | 2/2018 ............ H04W 48/08 |
| WO | WO-2018084990 A1 | 5/2018 |

OTHER PUBLICATIONS

First Office Action regarding Chinese Patent Application No. 201811134412.9, dated Sep. 3, 2020. Translation provided by Bohui Intellectual Property.

Second Office Action regarding Chinese Patent Application No. 201811134412.9, dated Mar. 8, 2021. Translation provided by Bohui Intellectual Property.

"Remaining Control Plane Issues of BWP," Qualcomm Incorporated, 3GPP TSG-RAN WG2 Meeting #100, R2-1713885, dated Dec. 1, 2017.

"Email Discussion [101bis#44] [NR] - SI Reception in Connected Mode," Samsung, 3GPP TSG-RAN2 102, R2-1808015, dated May 25, 2018.

First Office Action regarding Japanese Patent Application No. 2021-517624, dated Apr. 21, 2022. Translation provided by Bohui Intellectual Property.

"Reselection to a cell with initial BWP that has BW not support by UE," Nokia, Nokia Shanghai Bell, 3GPP TSG-RAN WG2 Meeting #103, R2-1811301, dated Aug. 24, 2018.

"Handling of UE for the camping cell with unsupported bandwidth," CATT, 3GPP TSG-RAN WG2 Meeting #103, R2-1811228, dated Aug. 24, 2018.

"BWP impact on idle/inactive mode," vivo, 3GPP TSG-RAN WG2 Meeting #100, R2-1712759, dated Dec. 1, 2017.

"On Bandwidth Parts and Multiple SSBs," Ericsson, 3GPP TSG-RAN WG2 #99bis, R2-1711822, dated Oct. 13, 2017.

* cited by examiner

ACCESS CONTROL METHOD, TERMINAL, AND NETWORK SIDE DEVICE

CROSS-REFERENCE OF RELATED APPLICATIONS

This application is a Bypass Continuation Application of PCT/CN2019/104854 filed on Sep. 9, 2019, which claims priority to Chinese patent Application No. 201811134412.9 filed on Sep. 27, 2018, which are incorporated herein by reference in their entirety.

TECHNICAL FIELD

The present disclosure relates to the field of communications technologies, and in particular, to an access control method, a terminal, and a network side device.

BACKGROUND

With the development of mobile communications systems, the fifth generation (5-th Generation, 5G) system is gradually applied. The 5G system can support a bandwidth much larger than that of a long term evolution (Long Term Evolution, LTE) system, to support greater systems and higher user throughputs. To achieve low-cost UE, the 5G system also supports dynamic and flexible bandwidth allocation, the bandwidth of the system is divided into multiple bandwidth parts (Band Width Part, BWP) to support narrowband terminal users.

SUMMARY

The embodiments of the present disclosure provide an access control method, a terminal, and a network side device, to resolve the problem of an access delay of user equipment and waste of a RACH resource of a system.

To resolve the foregoing technical problem, the present disclosure is implemented as follows:

According to a first aspect, the embodiments of the present disclosure provide an access control method, applied to a terminal, and including:

receiving network side access association information sent by a network side, where the network side access association information includes first information, and the first information indicates a bandwidth of an initial bandwidth part of a target cell, or a bandwidth of a default bandwidth part, or a bandwidth of a first activated bandwidth part; and when the terminal does not support the bandwidth of the initial bandwidth part, or the bandwidth of the default bandwidth part, or the bandwidth of the first activated bandwidth part, performing access control processing on the target cell according to the network side access association information.

According to a second aspect, the embodiments of the present disclosure provide an access control method, applied to a network side device, and including:

sending network side access association information, where the network side access association information includes first information, and the first information indicates a bandwidth of an initial bandwidth part of a target cell, or a bandwidth of a default bandwidth part, or a bandwidth of a first activated bandwidth part.

According to a third aspect, the embodiments of the present disclosure further provide another access control method, applied to a network side device, and including:

receiving an access request sent by a terminal; and scheduling the terminal according to a target bandwidth part, where a bandwidth of the target bandwidth part is: a bandwidth of a bandwidth part supported by a capability of the terminal, or a bandwidth of a minimum bandwidth part supported by a system, or a bandwidth of an initial bandwidth part of the cell, or a bandwidth of a default bandwidth part, or a bandwidth of a first activated bandwidth part.

According to a fourth aspect, an embodiment of the present disclosure further provides a terminal, including a memory, a processor, and a program stored in the memory and executable on the processor. The computer program, when executed by the processor, implements the steps of the access control method.

According to a fifth aspect, an embodiment of the present disclosure further provides a network side device, including: a memory, a processor, and a program stored in the memory and executable on the processor. The computer program, when executed by the processor, implements the steps of the access control method.

According to a sixth aspect, an embodiment of the present disclosure further provides a non-transitory computer readable storage medium. The non-transitory computer readable storage medium stores a program. The program, when executed by a processor, implements the steps of the access control method.

BRIEF DESCRIPTION OF DRAWINGS

To describe the technical solutions in the embodiments of the present disclosure more clearly, the following briefly describes the accompanying drawings required in the embodiments of the present disclosure. Apparently, the accompanying drawings in the following descriptions show merely some embodiments of the present disclosure, and a person of ordinary skill in the art may still derive other drawings from these accompanying drawings without creative efforts.

DETAILED DESCRIPTION OF EMBODIMENTS

The following clearly and completely describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure.

When a system supports different BWP bandwidths, before a user accesses a cell, a base station does not know a bandwidth supported by user equipment (User Equipment, UE). If the user equipment enters a cell in which a bandwidth of an initial access BWP is greater than a bandwidth capability supported by the user equipment, the user equipment initiates initial access in the cell repeatedly, resulting in an access delay of the user equipment and waste of a random access channel (Random Access Channel, RACH) resource of the system.

Figure 1:
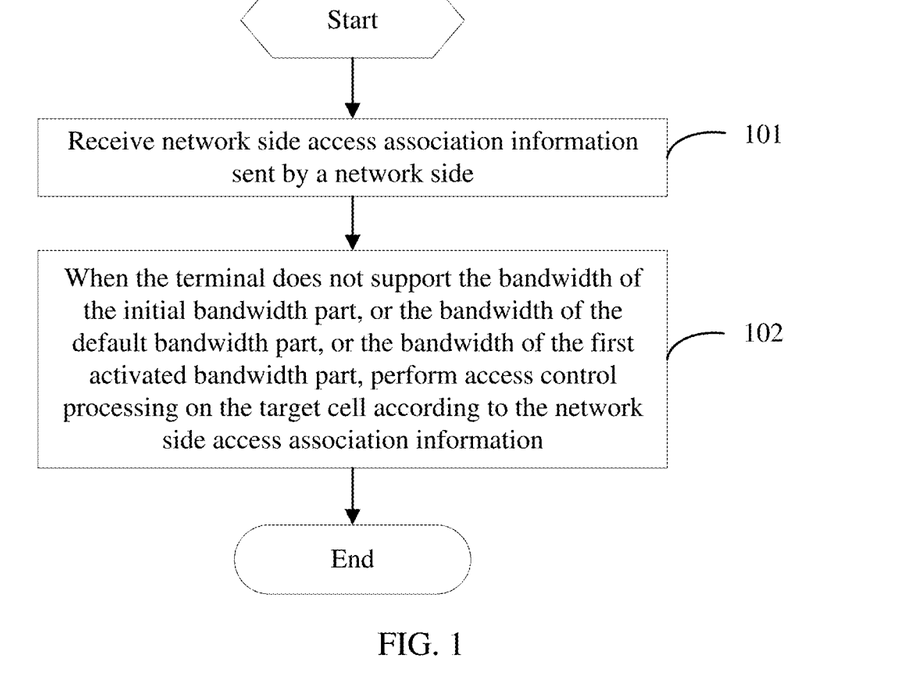
FIG. 1 is a first flowchart of an access control method according to an embodiment of the present disclosure.

Referring to FIG. 1, FIG. 1 is a flowchart of an access control method according to an embodiment of the present disclosure. The access control method is applied to a terminal. As shown in FIG. 1, the method includes the following steps: 101 and 102.

Step 101: Receive network side access association information sent by a network side, where the network side access association information includes first information, and the first information indicates a bandwidth of an initial bandwidth part of a target cell, or a bandwidth of a default bandwidth part, or a bandwidth of a first activated bandwidth part.

The first information may include any one or more pieces of information used to indicate the bandwidth of the initial bandwidth part of the target cell, or the bandwidth of the default bandwidth part of the target cell, or the bandwidth of the first activated bandwidth part of the target cell.

In this step, the terminal receives the network side association information sent by the network side device. The first information can be received in any of the following ways: a MIB (Master Information Block), an SIB1 (System Information Block 1), and dedicated RRC (Radio Resource Control) signaling. The dedicated RRC signaling includes: reconfiguration with sync (Reconfiguration with Sync) signaling, or a reconfiguration (Reconfiguration), or a handover command (Handover Command), an RRC release message, an RRC suspend command, etc.

In specific embodiments of the present disclosure, the terminal may perform access control processing according to the first information. This is further described in detail below.

Optionally, the network side access association information further includes other access assistance information, so that the terminal performs more accurate access control processing.

The access assistance information may include at least one of the following information:

second information, indicating whether a cell allows access by the terminal that does not support the bandwidth of the initial bandwidth part, or the bandwidth of the default bandwidth part, or the bandwidth of the first activated bandwidth part;

third information, indicating whether the cell supports flexible scheduling limitation;

fourth information, indicating a minimum bandwidth supported by the cell; and fifth information, indicating that when the terminal does not support the bandwidth of the initial bandwidth part of the cell, or the bandwidth of the default bandwidth part, or the bandwidth of the first activated bandwidth part, forbidding access to the cell.

The access assistance information can be received in any of the following ways: a MIB (Master Information Block), an SIB1 (System Information Block 1), and dedicated RRC (Radio Resource Control) signaling. The dedicated RRC signaling includes: reconfiguration with sync (Reconfiguration with Sync) signaling, or a handover command (Handover Command), an RRC release message, an RRC suspend command, etc.

In the third information, the flexible scheduling limitation can be understood as that the network side device schedules the terminal of random access according to one of the minimum system bandwidth, or the bandwidth of the initial bandwidth part, or the bandwidth of the default bandwidth part, or the bandwidth of the first activated bandwidth part, or flexibly schedules the terminal of access according to different bandwidths.

The network side device can send the auxiliary access information to the terminal in a preset way, and the terminal further determines the access processing for the target cell according to the auxiliary access information, so as to improve the flexibility of access processing.

Step 102: When the terminal does not support the bandwidth of the initial bandwidth part, or the bandwidth of the default bandwidth part, or the bandwidth of the first activated bandwidth part, perform access control processing on the target cell according to the network side access association information.

As described above, the network side access association information may include only the first information, or the access assistance information may be added based on the first information. The following describes the two cases.

<Case 1: The Network Side Access Association Information Includes Only the First Information>

When the network side access association information includes only the first information, the terminal may determine whether the terminal supports the bandwidth of the initial bandwidth part, or the bandwidth of the default bandwidth part, or the bandwidth of the first activated bandwidth part, and perform access control processing according to a determining result.

Optionally, when the terminal does not support the bandwidth of the initial bandwidth part, or the bandwidth of the default bandwidth part, or the bandwidth of the first activated bandwidth part, the terminal performs access control processing on the target cell according to any one of the following decisions:

Decision 1: forbidding access to the target cell.

In the decision, the terminal is forbidden to access the target cell when the condition in step 102 is met.

Decision 1: allowing access to the target cell.

In the decision, the terminal is allowed to access the target cell and can send an access request to the network side device when the condition in step 102 is met. In this manner, the network side device can decide whether to allow access or not, which is further described in detail below.

Decision 2: sending terminal side access association information.

In the decision, the terminal sends the terminal side access association information to the network side when the condition in step 102 is met, to decide according to whether the network side device indicates access to the cell. The terminal side access association information includes at least one of the following information:

sixth information, indicating bandwidth information supported by the terminal;

seventh information, indicating whether the terminal supports the minimum bandwidth part of the cell; and eighth information, indicating whether the terminal supports the bandwidth of the initial bandwidth part of the cell, or the bandwidth of the default bandwidth part, or the bandwidth of the first activated bandwidth part.

Decision 4: when a received enabling indication sent by the network side is enabling, sending terminal side access association information.

In the decision, based on decision 3, it is further limited that when the terminal receives an enabling sending indication sent by the network side, the terminal sends the terminal side access association information to the network side. For content of the terminal side access association information, refer to descriptions in decision 3.

In this manner, the bandwidth of the network can be saved. For example, when the network side knows terminal capability information and determines that the terminal does not support the bandwidth of the initial bandwidth part or the bandwidth of the default bandwidth part or the bandwidth of the first activated bandwidth part, and the network side does not allow access by the terminal that does not support the bandwidth of the initial bandwidth part, or the bandwidth of the default bandwidth part, or the bandwidth of the first activated bandwidth part, the network side can send the disabling enabling indication to prevent the terminal from sending. On the contrary, the enabling indication can be sent, to allow the terminal to send the terminal side access association information.

In addition, according to whether the network side supports access control over the terminal according to the access association information sent by the terminal, the network can also determine whether the terminal is allowed to send the terminal side access association information. For example, when the network side supports flexible bandwidth scheduling, or schedules the terminal of access according to one of the system minimum bandwidth, the bandwidth of the initial bandwidth part, the bandwidth of the default bandwidth part, or the bandwidth of the first activated bandwidth part, the network side may not allow the terminal to send the access association information. At this time, the enabling indication is set as disable. If the network side needs to determine, according to the access association information sent by the terminal, whether the terminal is allowed to access, the enabling indication information is set as enable.

Decision 5: sending terminal side access association information; receiving access indication information, where the access indication information is determined by the network side based on the terminal side access association information and indicates whether to allow the terminal to access; and when the access indication information indicates rejecting access by the terminal, forbidding access to the target cell.

In the decision, the terminal sends the terminal side access association information to the network side, to decide whether to access the target cell according to the instruction by the network side.

Based on the bandwidth part supported by the terminal indicated by the terminal side access association information, the network side device can determine whether the terminal supports the bandwidth part of the cell, that is, whether the terminal satisfies the condition of access to the target cell; or according to whether the terminal supports the minimum bandwidth part of the cell indicated by the terminal side access association information, the network side device can determine whether the terminal meets the condition of access to the target cell; or according to whether the terminal supports the bandwidth of the initial bandwidth part of the cell, or the bandwidth of the default bandwidth part, or the bandwidth of the first activated bandwidth part indicated by the terminal side access association information, the network side device can determine whether the terminal meets the condition of access to the target cell.

According to the determining result, the network side device sends, to the terminal side, the access indication information indicating whether to allow the terminal to access. If the access indication information indicates rejecting the terminal to access the target cell, the terminal is forbidden to access the target cell according to the indication of the network side.

Decision 6: when a received enabling indication sent by the network side is enabling, sending terminal side access association information; receiving access indication information, where the access indication information is determined by the network side based on the terminal side access association information and indicates whether to allow the terminal to access; and when the access indication information indicates rejecting access by the terminal, forbidding access to the target cell.

In the decision, based on decision 5, it is further limited that when a received enabling indication sent by the network side is enabling, terminal side access association information is sent.

In this implementation, when the terminal does not support the bandwidth of the target cell, that is, the terminal does not support the bandwidth of the initial bandwidth part or the bandwidth of the default bandwidth part or the bandwidth of the first activated bandwidth part, the terminal performs access control according to any of the above decisions, to improve access efficiency, reduce UE access delay, and reduce waste of a RACH resource of the system.

<Case 2: The Network Side Access Association Information Includes the First Information and the Access Assistance Information>

When the network side access association information includes first information and the access assistance information, the terminal can perform access control processing on the target cell according to the following decisions based on the network side access association information and the access assistance information, to improve the accuracy of the decision.

Decision 1: when the second information or the third information indicates "no", forbidding access to the target cell.

That is, when the network side indicates that the cell does not allow access by the terminal that does not support the bandwidth of the initial bandwidth part, or the bandwidth of the default bandwidth part, or the bandwidth of the first activated bandwidth part, the terminal is forbidden to access the target cell according to the network side access association information, that is, does not select the target cell as a candidate cell for selection and reselection.

Decision 2: when the terminal does not support a minimum bandwidth indicated by the fourth information, forbidding access to the target cell.

In this decision, the terminal does not support the minimum bandwidth supported by the cell, and the terminal is forbidden to access the target cell.

In other words, when the terminal does not support the minimum bandwidth supported by the cell, even if the network side allows, the terminal can not access the cell. In this case, the terminal is forbidden to access the target cell according to the network side access association information, that is, does not select the target cell as a candidate cell for selection and reselection.

Decision 3: when the second information or the third information indicates "no", or the terminal does not support the minimum bandwidth part indicated by the fourth information, sending the terminal side access association information.

In the decision, under the same conditions as in decision 1 or in decision 2, the terminal does not first determine whether the terminal is forbidden to access the target cell, instead, further sends the terminal side access association information to the network side, so that the network side device determines, according to the terminal side access association information, whether access to the cell is allowed, and determines, according to indication of the network side, whether to access the cell. The terminal side access association information includes at least one of the following information:

sixth information, indicating bandwidth information supported by the terminal;

seventh information, indicating whether the terminal supports the minimum bandwidth part of the cell; and eighth information, indicating whether the terminal supports the bandwidth of the initial bandwidth part of the cell, or the bandwidth of the default bandwidth part, or the bandwidth of the first activated bandwidth part.

Decision 4: when the second information or the third information indicates "no", or the terminal does not support the minimum bandwidth part indicated by the fourth information, sending terminal side access association information; receiving access indication information, where the access indication information is determined by the network side based on the terminal side access association information and indicates whether to allow the terminal to access; and when the access indication information indicates rejecting access by the terminal, forbidding access to the target cell.

The difference between this decision and decision 3 is whether to further receive the indication information from the network side. The network side can determine whether the terminal meets the condition of access to the target cell based on the terminal side access association information. When the indication information indicates rejecting the terminal to access, it means that the terminal does not meet the condition of access to the target cell, and the terminal is forbidden to access the target cell.

Certainly, when the second information or the third information indicates "yes", or the terminal supports the minimum bandwidth part indicated by the fourth information, the terminal can select and reselect a cell according to the condition and process of cell selection and reselection.

In this manner, when the terminal does not support the bandwidth of the initial bandwidth part, or the bandwidth of the default bandwidth part, or the bandwidth of the first activated bandwidth part, the terminal may further determine based on the access assistance information sent by the network side. This reduces the access delay of the terminal, power consumption of the terminal, and waste of a RACH resource of the system.

Of course, in specific embodiments of the present disclosure, the decision can be further improved by combining with the enabling indication of the network side. In this case, the specific embodiment of the present disclosure can also include decision 5 and decision 6.

Decision 5: when the second information or the third information indicates "no", or the terminal does not support the minimum bandwidth part indicated by the fourth information, but the enabling indication sent by the network side is enabling, sending the terminal side access association information.

In other words, when the first preset condition is met, the terminal side access association information is sent. That the first preset condition is met includes two cases:

when the second information or the third information indicates "no" and the enabling indication sent by the network side is allowing; or the terminal does not support the minimum bandwidth part indicated by the fourth information and the enabling indication sent by the network side is allowing.

Decision 6:

when the second information or the third information indicates "no", or the terminal does not support the minimum bandwidth part indicated by the fourth information, but the enabling indication sent by the network side is enabling, sending terminal side access association information; receiving access indication information determined by the network side based on the terminal side access association information; and when the access indication information indicates rejecting access by the terminal, forbidding access to the target cell.

That is, when a second preset condition is met, sending terminal side access association information; receiving access indication information determined by the network side based on the terminal side access association information; and when the access indication information indicates rejecting access by the terminal, forbidding access to the target cell.

That the second preset condition is met includes two cases:

the second information or the third information indicates "no", and the enabling indication sent by the network side is allowing; or the terminal does not support the minimum bandwidth part indicated by the fourth information and the enabling indication sent by the network side is allowing.

In the specific embodiments of the present disclosure, forbidding access to the target cell can be directly forbidding access to the target cell, or at least one of the following operations:

operation 1: forbidding access to the target cell in a preset time;

operation 2: forbidding access to an intra-frequency cell of the target cell;

operation 3: forbidding access to an intra-frequency cell of the target cell in a preset time;

operation 4: adding the target cell to a cell blacklist list;

operation 5: adding the target cell to a cell blacklist list in a preset time; and operation 6: deleting the target cell from a neighboring cell list.

Herein, it should be noted that the forbidding access to the target cell refers to that the terminal is forbidden to access the target cell or the intra-frequency cell of the target cell, etc.

Operations 1 to 6 can further limit the operation of forbidding access to the target cell. The terminal can select one of operation 2 and operation 3, and one of operation 4 and operation 5. For other operations, multiple operations can be executed at the same time.

In operation 1, the terminal excludes the target cell from cell selection and reselection of a candidate cell in a preset time, and after the preset time, the target cell can be used as a candidate cell of reselection.

In operation 3, the terminal excludes another intra-frequency cell at a frequency of the target cell from cell selection and reselection of a candidate cell in a preset time, and after the preset time, another intra-frequency cell at the frequency of the target cell can be used as a candidate cell of reselection.

In this implementation, the terminal is forbidden to access the target cell, to improve the flexibility of the cell selection, improve the access efficiency, and reduce the access delay.

Optionally, the preset time is different from duration that is broadcasted by system information and in which access to the cell is forbidden (300 s).

In the embodiments of the present disclosure, the access control method can be applied to the terminal, such as a mobile phone, a tablet personal computer (Tablet Personal Computer), a laptop computer (Laptop Computer), a personal digital assistant (personal digital assistant, PDA for short), a mobile Internet device (Mobile Internet Device, MID), a wearable device (Wearable Device), etc.

In the method in the embodiments of the present disclosure, network side access association information sent by a network side is received, where the network side access association information includes first information, and the first information indicates a bandwidth of an initial bandwidth part of a target cell, or a bandwidth of a default bandwidth part, or a bandwidth of a first activated bandwidth part; and when the terminal does not support the bandwidth of the initial bandwidth part, or the bandwidth of the default bandwidth part, or the bandwidth of the first activated bandwidth part, performing access control processing on the target cell according to the network side access association information. In this way, when the terminal does not support the bandwidth of the initial bandwidth part, or the bandwidth of the default bandwidth part, or the bandwidth of the first activated bandwidth part, the terminal may perform access control processing on the target cell according to the network side access association information. This can reduce the access delay of the terminal, the waste of a RACH resource of the system, and power consumption of the terminal.

Figure 2:
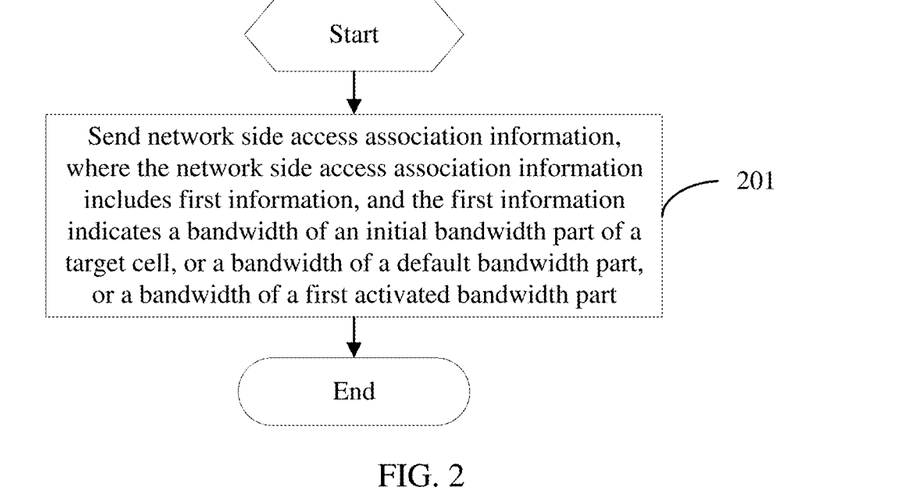
FIG. 2 is a second flowchart of an access control method according to an embodiment of the present disclosure.

Referring to FIG. 2, the main difference between this embodiment and the above embodiments is that the access control method is implemented from the perspective of a network side device. FIG. 2 is a flowchart of an access control method according to an embodiment of the present disclosure. As shown in FIG. 2, the method includes the following steps:

Step 201: Receive network side access association information sent by a network side, where the network side access association information includes first information, and the first information indicates a bandwidth of an initial bandwidth part of a target cell, or a bandwidth of a default bandwidth part, or a bandwidth of a first activated bandwidth part.

The network side device sends the network side access association information to the terminal, where the network side access association information includes information that indicates a bandwidth of an initial bandwidth part of a target cell, or a bandwidth of a default bandwidth part, or a bandwidth of a first activated bandwidth part.

The network side access association information may be sent to the terminal in any of the following manners: a MIB (Master Information Block), an SIB1 (System Information Block 1), and dedicated RRC (Radio Resource Control) signaling. The dedicated RRC signaling includes: reconfiguration with sync (Reconfiguration with Sync) signaling, or a handover command (Handover Command), an RRC release message, an RRC suspend command, etc.

Optionally, the network side access association information further includes access assistance information, and the access assistance information includes at least one of the following information:

second information, indicating whether a cell allows access by the terminal that does not support the bandwidth of the initial bandwidth part, or the bandwidth of the default bandwidth part, or the bandwidth of the first activated bandwidth part;

third information, indicating whether the cell supports flexible scheduling limitation;

fourth information, indicating a minimum bandwidth part supported by the cell; and fifth information, indicating that when the terminal does not support the bandwidth of the initial bandwidth part of the cell, or the bandwidth of the default bandwidth part, or the bandwidth of the first activated bandwidth part, forbidding access to the cell.

While the network side device sends the network side access association information to the terminal, the network side device may further send the access assistance information to the terminal, so that the terminal determines whether to access the cell according to the access assistance information, or negotiates with the terminal to determine whether to access the cell.

Similarly, the access assistance information can be sent to the terminal in any of the following manners: a MIB (Master Information Block), an SIB1 (System Information Block 1), and dedicated RRC (Radio Resource Control) signaling. The dedicated RRC signaling includes: reconfiguration with sync (Reconfiguration with Sync) signaling, or a handover command (Handover Command), an RRC release message, an RRC suspend command, etc.

Optionally, the sending the network side access association information, further including:

receiving terminal side access association information sent by a terminal when a third predetermined condition or a fourth predetermined condition is met;

that the third predetermined condition is met includes:

the terminal does not support the bandwidth of the initial bandwidth part, or the bandwidth of the default bandwidth part, or the bandwidth of the first activated bandwidth part; and the second information or the third information indicates "no"; or the terminal does not support the bandwidth of the initial bandwidth part, or the bandwidth of the default bandwidth part, or the bandwidth of the first activated bandwidth part; and the terminal does not support a minimum bandwidth part indicated by the fourth information; and that the fourth predetermined condition is met includes: the terminal does not support the bandwidth of the initial bandwidth part, or the bandwidth of the default bandwidth part, or the bandwidth of the first activated bandwidth part.

In this implementation, after the network side device sends the network side access association information to the terminal, the terminal may send the terminal side access association information to the network side according to the network side access association information. For example, the terminal sends the terminal side access association information to the network side device when the third predetermined condition or the fourth predetermined condition is met. For example, the terminal sends terminal side access association information to the network side device when a third predetermined condition or a fourth predetermined condition is met.

The terminal side access association information includes at least one of the following information:

sixth information, indicating bandwidth information supported by the terminal;

seventh information, indicating whether the terminal supports the minimum bandwidth part of the cell; and eighth information, indicating whether the terminal supports the bandwidth of the initial bandwidth part of the cell, or the bandwidth of the default bandwidth part, or the bandwidth of the first activated bandwidth part.

In this way, the network side device may determine, based on the terminal side access association information, whether to allow the terminal to access the cell. For example, based on the bandwidth information supported by the terminal indicated by the terminal side access association information, the network side device can determine whether the terminal supports the bandwidth of the cell; or according to whether the terminal supports the minimum bandwidth part of the cell indicated by the terminal side access association information, the network side device can determine whether the terminal supports the bandwidth of the cell; or according to whether the terminal supports the bandwidth of the initial bandwidth part of the cell, or the bandwidth of the default bandwidth part, or the bandwidth of the first activated bandwidth part indicated by the terminal side access association information, the network side device can determine whether the terminal supports the bandwidth of the cell. According to the above determining, when the terminal supports the bandwidth of the cell, the terminal is allowed to access the cell; when the terminal does not support the bandwidth of the cell, the terminal is not allowed to access the cell.

In this implementation, the network side device receives the terminal side access association information sent by the terminal when the predetermined condition is met, to further determine whether the terminal is allowed to access the cell according to the terminal side access association information. This can improve the flexibility of determining and access efficiency and reduce an access delay.

Optionally, after the receiving terminal side access association information sent by a terminal when a third predetermined condition or a fourth predetermined condition is met, the method further includes:

sending access indication information, where the access indication information is determined by the network side based on the terminal side access association information, and indicates whether to allow the terminal to access.

In this implementation, after the network side device determines, based on the terminal side access association information, whether to allow the terminal to access, the network side device further sends the access indication information to the terminal, to indicate whether the terminal is allowed to access the cell. The terminal can quickly determine, based on indication of the network side, whether to access the cell, which can reduce an access delay of the terminal and improve access efficiency.

In the access control method in the embodiments of the present disclosure, the network side device sends the network side access association information to the terminal, so that the terminal can determine, according to the network side access association information, whether to access the cell, or the network side device determines, according to the terminal side access association information sent by the terminal side, whether to allow the terminal to access the cell. The various decisions provided by the embodiments of the present disclosure can improve the flexibility of the decision, reduce the access delay of the terminal, reduce the waste of RACH resources of the system, and reduce the power consumption of the terminal As described above, when the network side access association information may include only the first information, when the terminal does not support the bandwidth of the initial bandwidth part of the cell, or the bandwidth of the default bandwidth part, or the bandwidth of the first activated bandwidth part, access control processing of the terminal may be allowing access to the target cell.

At the same time, in specific embodiments of the present disclosure, the terminal can also directly initiate the access request as in related technologies.

Figure 3:
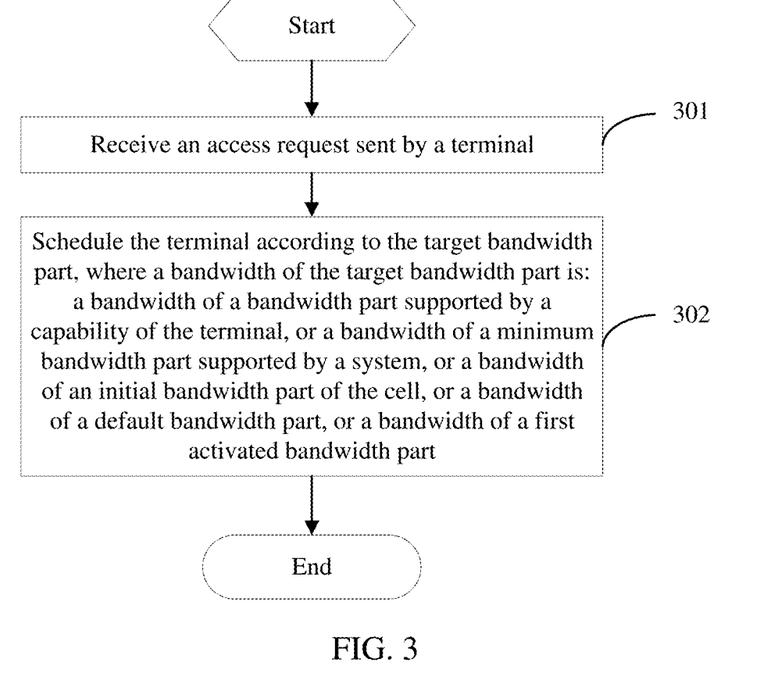
FIG. 3 is a third flowchart of an access control method according to an embodiment of the present disclosure.

In the two cases, as shown in FIG. 3, another access control method provided in the embodiments of the present disclosure includes the following steps.

Step 301: Receive an access request sent by a terminal.

Step 302: Schedule the terminal according to the target bandwidth part, where a bandwidth of the target bandwidth part is: a bandwidth of a bandwidth part supported by a capability of the terminal, or a bandwidth of a minimum bandwidth part supported by a system, or a bandwidth of an initial bandwidth part of the cell, or a bandwidth of a default bandwidth part, or a bandwidth of a first activated bandwidth part.

In this implementation, the terminal sends the access request to the network side device, and the network side device schedules the terminal according to the access request and the target bandwidth part. For example, according to the bandwidth of the bandwidth part supported by the terminal, the bandwidth of the minimum bandwidth part supported by the system, the bandwidth of the initial bandwidth part of the cell, the bandwidth of the default bandwidth part, and the bandwidth of the first activated bandwidth part, the network side device selects one of them to enable the terminal to support the bandwidth of the cell, to improve the access reliability of the terminal, improve the access efficiency of the terminal, and reduce an access delay.

Optionally, the scheduling the terminal according to a target bandwidth part may be:

before capability information of the terminal is obtained, scheduling the terminal according to the bandwidth of the minimum bandwidth part supported by the system; or after capability information of the terminal is obtained, scheduling the terminal according to a bandwidth of a bandwidth part supported by the capability of the terminal.

In this implementation, before the network side device obtains the bandwidth information that the terminal can support, the network side device can first schedule the terminal according to the bandwidth of the minimum bandwidth part supported by the system, that is, preferentially allows the terminal to access, to improve the success rate of the terminal. After obtaining the bandwidth information that the terminal can support, the network side device can schedule the terminal according to the bandwidth of the bandwidth part supported by the terminal. In this case, the bandwidth activated by the terminal matches the terminal capability, which can improve access performance of the terminal and the efficiency of data transmission.

In the access control method in the embodiments of the present disclosure, the network side device schedules the terminal according to the target bandwidth part, which can improve scheduling flexibility of the terminal, improve access reliability of the terminal and access efficiency of the terminal, and reduce an access delay.

Figure 4:
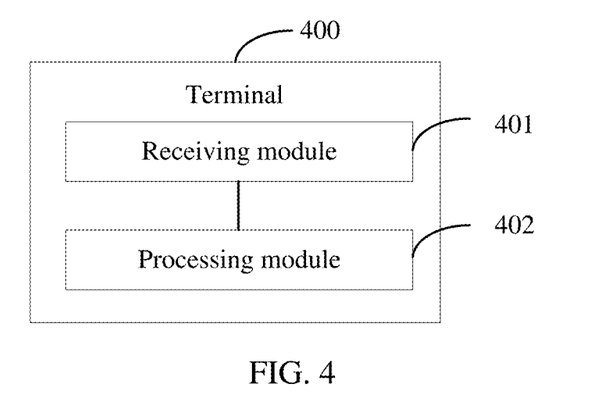
FIG. 4 is a first structural diagram of a terminal according to an embodiment of the present disclosure.

Referring to FIG. 4, FIG. 4 is a structural diagram of a terminal according to an embodiment of the present disclosure. As shown in FIG. 4, the terminal 400 includes: a receiving module 401 and a processing module 402.

a receiving module 401, configured to receive network side access association information sent by a network side, where the network side access association information includes first information, and the first information indicates a bandwidth of an initial bandwidth part of a target cell, or a bandwidth of a default bandwidth part, or a bandwidth of a first activated bandwidth part; and a processing module 402, configured to: when the terminal does not support the bandwidth of the initial bandwidth part, or the bandwidth of the default bandwidth part, or the bandwidth of the first activated bandwidth part, perform access control processing on the target cell according to the network side access association information.

In this way, when the terminal does not support the bandwidth of the initial bandwidth part, or the bandwidth of the default bandwidth part, or the bandwidth of the first activated bandwidth part, the terminal may perform access control processing on the target cell according to the network side access association information. This can reduce the access delay of the terminal, the waste of a RACH resource of the system, and power consumption of the terminal.

Optionally, the processing module 402 is configured to:
forbid access to the target cell; or
allow access to the target cell; or
send terminal side access association information; or
when a received enabling indication sent by the network side is allowing, send terminal side access association information; or
send terminal side access association information; or
receive access indication information, where the access indication information is determined by the network side based on the terminal side access association information, and indicates whether to allow the terminal to access.

When the access indication information indicates rejecting access by the terminal, access to the target cell is forbidden; or when a received enabling indication sent by the network side is allowing, terminal side access association information is sent; or access indication information is received, where the access indication information is determined by the network side based on the terminal side access association information, and indicates whether to allow the terminal to access.

When the access indication information indicates rejecting access by the terminal, access to the target cell is forbidden.

Optionally, the network side access association information further includes access assistance information, and the access assistance information includes at least one of the following information:

second information, indicating whether a cell allows access by the terminal that does not support the bandwidth of the initial bandwidth part, or the bandwidth of the default bandwidth part, or the bandwidth of the first activated bandwidth part;

third information, indicating whether the cell supports flexible scheduling limitation;

fourth information, indicating a minimum bandwidth supported by the cell; and fifth information, indicating that when the terminal does not support the bandwidth of the initial bandwidth part of the cell, or the bandwidth of the default bandwidth part, or the bandwidth of the first activated bandwidth part, forbidding access to the cell.

Optionally, the processing module 402 is configured to:
when the second information or the third information indicates "no", forbid access to the target cell;
when the terminal does not support a minimum bandwidth indicated by the fourth information, forbid access to the target cell;
when the second information or the third information indicates "no", or the terminal does not support the minimum bandwidth part indicated by the fourth information, send the terminal side access association information;
when the second information or the third information indicates "no", or the terminal does not support the minimum bandwidth part indicated by the fourth information, send the terminal side access association information; and
receive access indication information, where the access indication information is determined by the network side based on the terminal side access association information and indicates whether to allow the terminal to access; and when the access indication information indicates rejecting access by the terminal, forbid access to the target cell.

Optionally, the terminal side access association information includes at least one of the following information:

sixth information, indicating bandwidth information supported by the terminal;

seventh information, indicating whether the terminal supports the minimum bandwidth part of the cell; and eighth information, indicating whether the terminal supports the bandwidth of the initial bandwidth part of the cell, or the bandwidth of the default bandwidth part, or the bandwidth of the first activated bandwidth part.

Optionally, the processing module 402 is configured to perform at least one of the following operations:
forbidding access to the target cell in a preset time;
forbidding access to an intra-frequency cell of the target cell;
forbidding access to an intra-frequency cell of the target cell in a preset time;
adding the target cell to a cell blacklist list;
adding the target cell to a cell blacklist list in a preset time; and
deleting the target cell from a neighboring cell list.

Optionally, the preset time is different from duration that is broadcasted by system information and in which access to the cell is forbidden.

The terminal 400 can implement each process implemented by the terminal in the foregoing method embodiment. To avoid repetition, details are not described herein again.

For the terminal 400 in the embodiments of the present disclosure, when the terminal does not support the bandwidth of the initial bandwidth part, or the bandwidth of the default bandwidth part, or the bandwidth of the first activated bandwidth part, the terminal may perform access control processing on the target cell according to the network side access association information. This can reduce the access delay of the terminal, reduce the waste of RACH resources of the system, and reduce the power consumption of the terminal.

Figure 5:
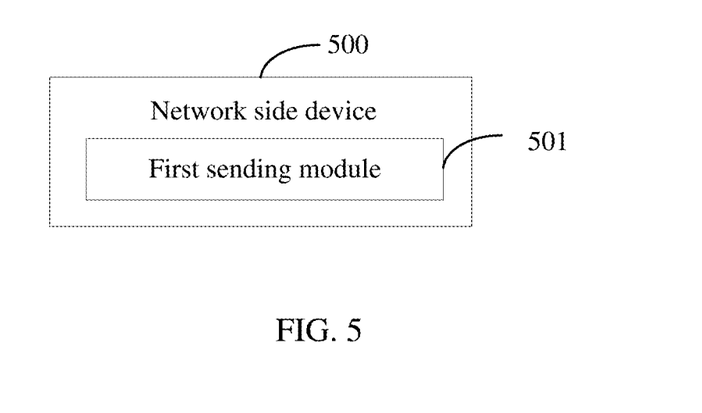
FIG. 5 is a first structural diagram of a network side device according to an embodiment of the present disclosure.

Referring to FIG. 5, FIG. 5 is a structural diagram of a network side device according to an embodiment of the present disclosure. As shown in FIG. 5, the network side device 500 includes: a first sending module 501.

The first sending module 501 is configured to send network side access association information, where the network side access association information includes first information, and the first information indicates a bandwidth of an initial bandwidth part of a target cell, or a bandwidth of a default bandwidth part, or a bandwidth of a first activated bandwidth part.

Optionally, the network side access association information further includes access assistance information, and the access assistance information includes at least one of the following information:

second information, indicating whether a cell allows access by the terminal that does not support the bandwidth of the initial bandwidth part, or the bandwidth of the default bandwidth part, or the bandwidth of the first activated bandwidth part;

third information, indicating whether the cell supports flexible scheduling limitation;

fourth information, indicating a minimum bandwidth supported by the cell; and fifth information, indicating that when the terminal does not support the bandwidth of the initial bandwidth part of the cell, or the bandwidth of the default bandwidth part, or the bandwidth of the first activated bandwidth part, forbidding access to the cell.

Optionally, the network side device further includes:

a receiving module, configured to receive terminal side access association information sent by a terminal when a third predetermined condition or a fourth predetermined condition is met;

that the third predetermined condition is met includes: the terminal does not support the bandwidth of the initial bandwidth part, or the bandwidth of the default bandwidth part, or the bandwidth of the first activated bandwidth part; and the second information or the third information indicates "no"; or the terminal does not support the bandwidth of the initial bandwidth part, or the bandwidth of the default bandwidth part, or the bandwidth of the first activated bandwidth part; and the terminal does not support a minimum bandwidth part indicated by the fourth information; and that the fourth predetermined condition is met includes: the terminal does not support the bandwidth of the initial bandwidth part, or the bandwidth of the default bandwidth part, or the bandwidth of the first activated bandwidth part.

Optionally, the network side device further includes:

a second sending module, configured to send access indication information, where the access indication information is determined by the network side based on the terminal side access association information, and indicates whether to allow the terminal to access.

Optionally, the terminal side access association information includes at least one of the following information:

sixth information, indicating bandwidth information supported by the terminal;

seventh information, indicating whether the terminal supports the minimum bandwidth part of the cell; and eighth information, indicating whether the terminal supports the bandwidth of the initial bandwidth part of the cell, or the bandwidth of the default bandwidth part, or the bandwidth of the first activated bandwidth part.

The network side device 500 can implement each process implemented by the network side device in the foregoing method embodiments. To avoid repetition, details are not described herein again.

Figure 6:
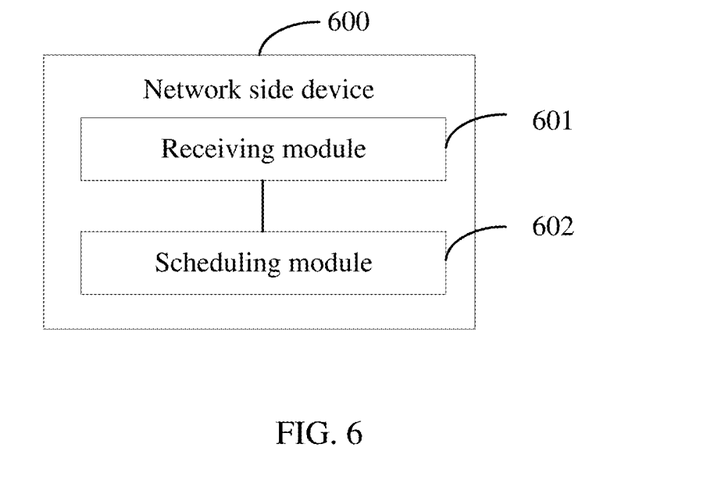
FIG. 6 is a second structural diagram of a network side device according to an embodiment of the present disclosure.

For the network side device 500 in the embodiments of the present disclosure, the network side device sends the network side access association information to the terminal, so that the terminal can determine, according to the network side access association information, whether to access the cell, or the network side device determines, according to the terminal side access association information sent by the terminal side, whether to allow the terminal to access the cell. The various decisions provided by the embodiments of the present disclosure can improve the flexibility of the decision, reduce the access delay of the terminal, reduce the waste of RACH resources of the system, and reduce the power consumption of the terminal Referring to FIG. 6, FIG. 6 is a structural diagram of a network side device according to an embodiment of the present disclosure. As shown in FIG. 6, the network side device 600 includes: a receiving module 601 and a schedule module 602.

a receiving module 601, configured to receive an access request sent by a terminal; and a scheduling module 602, configured to schedule the terminal according to a target bandwidth part, where a bandwidth of the target bandwidth part is: a bandwidth of a bandwidth part supported by a capability of the terminal, or a bandwidth of a minimum bandwidth part supported by a system, or a bandwidth of an initial bandwidth part of the cell, or a bandwidth of a default bandwidth part, or a bandwidth of a first activated bandwidth part.

Optionally, the scheduling module 602 is configured to:

before capability information of the terminal is obtained, schedule the terminal according to the bandwidth of the minimum bandwidth part supported by the system; or after capability information of the terminal is obtained, schedule the terminal according to a bandwidth of a bandwidth part supported by the capability of the terminal.

The network side device 600 can implement each process implemented by the network side device in the foregoing method embodiments. To avoid repetition, details are not described herein again.

For the network side device 600 in the embodiments of the present disclosure, the network side device schedules the terminal according to the target bandwidth part, which can improve scheduling flexibility of the terminal, improve access reliability of the terminal and access efficiency of the terminal, and reduce an access delay.

Figure 7:
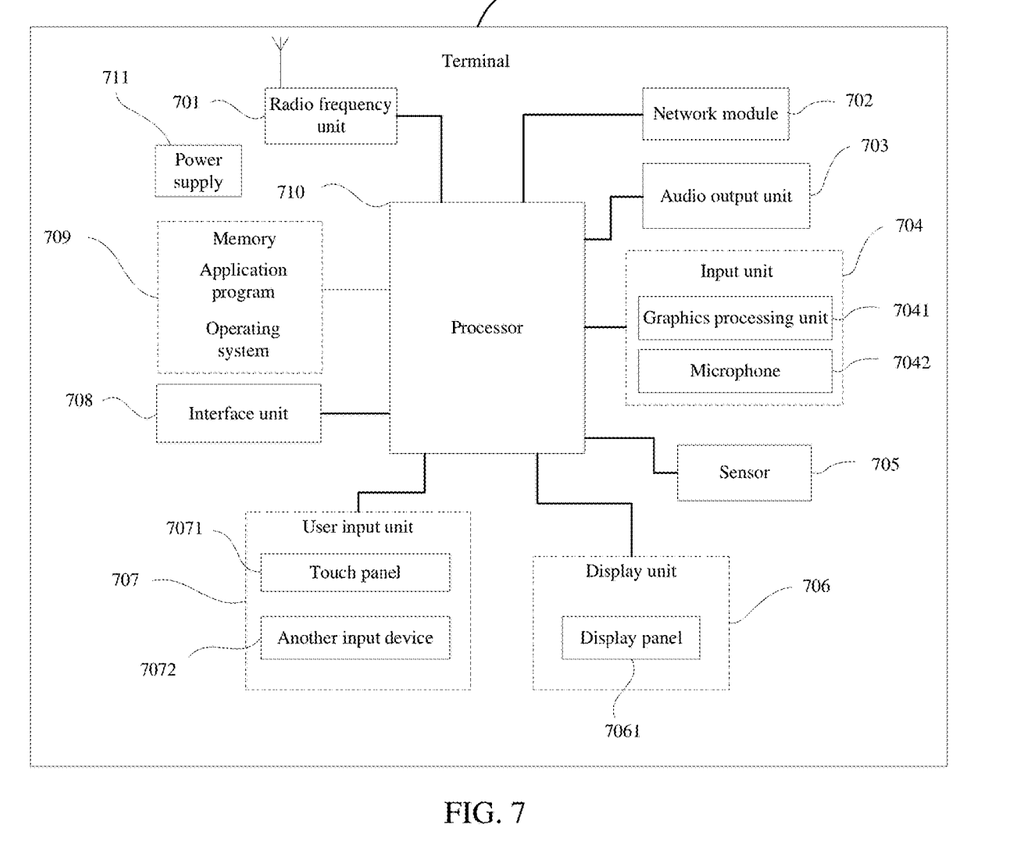
FIG. 7 is a second structural diagram of a terminal according to an embodiment of the present disclosure.

FIG. 7 is a schematic structural diagram of hardware of a terminal implementing embodiments of the present disclosure. The terminal 700 includes but is not limited to: a radio frequency unit 701, a network module 702, an audio output unit 703, an input unit 704, a sensor 705, a display unit 706, a user input unit 707, an interface unit 708, a memory 709, a processor 710, a power supply 711, and other components. A person skilled in the art may understand that the structure of the terminal shown in FIG. 7 does not constitute a limitation to the terminal. The terminal may include more or fewer components than that shown in the figure, or a combination of some components, or an arrangement of different components. In this embodiment of the present disclosure, the terminal includes but is not limited to a mobile phone, a tablet computer, a notebook computer, a palmtop computer, a vehicle-mounted terminal, a wearable device, a pedometer, or the like.

The radio frequency unit 701 is configured to receive network side access association information sent by a network side, where the network side access association information includes first information, and the first information indicates a bandwidth of an initial bandwidth part of a target cell, or a bandwidth of a default bandwidth part, or a bandwidth of a first activated bandwidth part.

The processor 710 is configured to: when the terminal does not support the bandwidth of the initial bandwidth part, or the bandwidth of the default bandwidth part, or the bandwidth of the first activated bandwidth part, perform access control processing on the target cell according to the network side access association information.

Optionally, the performing, by the processor 710, access control processing on the target cell according to the network side access association information may be:

forbid access to the target cell; or allow access to the target cell; or send terminal side access association information; or when a received enabling indication sent by the network side is allowing, send terminal side access association information; or send terminal side access association information; or receive access indication information, where the access indication information is determined by the network side based on the terminal side access association information, and indicates whether to allow the terminal to access.

When the access indication information indicates rejecting access by the terminal, access to the target cell is forbidden; or when a received enabling indication sent by the network side is allowing, terminal side access association information is sent; or access indication information is received, where the access indication information is determined by the network side based on the terminal side access association information, and indicates whether to allow the terminal to access.

When the access indication information indicates rejecting access by the terminal, access to the target cell is forbidden.

Optionally, the network side access association information further includes access assistance information, and the access assistance information includes at least one of the following information:

second information, indicating whether a cell allows access by the terminal that does not support the bandwidth of the initial bandwidth part, or the bandwidth of the default bandwidth part, or the bandwidth of the first activated bandwidth part;

third information, indicating whether the cell supports flexible scheduling limitation;

fourth information, indicating a minimum bandwidth supported by the cell; and fifth information, indicating that when the terminal does not support the bandwidth of the initial bandwidth part of the cell, or the bandwidth of the default bandwidth part, or the bandwidth of the first activated bandwidth part, forbidding access to the cell.

Optionally, the performing access control processing on the target cell according to the network side access association information may be:

when the second information or the third information indicates "no", the processor 710 forbids access to the target cell;

when the terminal does not support a minimum bandwidth indicated by the fourth information, the processor 710 forbids access to the target cell;

when the second information or the third information indicates "no", or the terminal does not support the minimum bandwidth part indicated by the fourth information, the radio frequency unit 701 sends the terminal side access association information; and when the second information or the third information indicates "no", or the terminal does not support the minimum bandwidth part indicated by the fourth information, the radio frequency unit 701 sends the terminal side access association information.

The radio frequency unit 701 receives access indication information, where the access indication information is determined by the network side based on the terminal side access association information, and indicates whether to allow the terminal to access.

When the access indication information indicates rejecting access by the terminal, the processor 710 forbids access to the target cell.

Optionally, the terminal side access association information includes at least one of the following information:

sixth information, indicating bandwidth information supported by the terminal;

seventh information, indicating whether the terminal supports the minimum bandwidth part of the cell; and eighth information, indicating whether the terminal supports the bandwidth of the initial bandwidth part of the cell, or the bandwidth of the default bandwidth part, or the bandwidth of the first activated bandwidth part.

Optionally, the forbidding access to the target cell may include at least one of the following operations by the processor 710:

forbidding access to the target cell in a preset time;

forbidding access to an intra-frequency cell of the target cell;

forbidding access to an intra-frequency cell of the target cell in a preset time;

adding the target cell to a cell blacklist list;

adding the target cell to a cell blacklist list in a preset time; and deleting the target cell from a neighboring cell list.

Optionally, the preset time is different from duration that is broadcasted by system information and in which access to the cell is forbidden.

It should be understood that, in this embodiment of the present disclosure, the radio frequency unit 701 may be configured to receive and transmit information, or receive and transmit signals during a call. For example, the radio frequency unit 701 receives downlink data from a base station, and transmits the downlink data to the processor 710 for processing; and in addition, transmits uplink data to the base station. Generally, the radio frequency unit 701 includes but is not limited to an antenna, at least one amplifier, a transceiver, a coupler, a low noise amplifier, a duplexer, and the like. In addition, the radio frequency unit 701 may further communicate with another device by using a wireless communications system and network.

The terminal provides a user with wireless broadband Internet access through the network module 702, for example, helps the user send and receive emails, browse web pages, and access streaming media.

The audio output unit 703 may convert audio data received by the radio frequency unit 701 or the network module 702 or stored in the memory 709 into an audio signal, and output the audio signal as sound. Moreover, the audio output unit 703 may further provide audio output (for example, call signal receiving sound and message receiving sound) related to a specific function performed by the terminal 700. The audio output unit 703 includes a loudspeaker, a buzzer, a receiver, and the like.

The input unit 704 is configured to receive an audio signal or a video signal. The input unit 704 can include a graphics processing unit (Graphics Processing Unit) 7041 and a microphone 7042. The graphics processing unit 7041 processes image data of static pictures or videos acquired by an image capturing device (for example a camera) in a video capturing mode or an image capturing mode. A processed image frame may be displayed on the display unit 706. The image frame processed by the graphics processing unit 7041 can be stored in the memory 709 (or another storage medium) or sent via the radio frequency unit 701 or the network module 702. The microphone 7042 may receive sound and can process such sound into audio data. The processed audio data may be converted, in a call mode, into a format that can be sent by the radio frequency unit 701 to a mobile communication base station for output.

The terminal 700 further includes at least one sensor 705, such as an optional sensor, a motion sensor, and another sensor. For example, the light sensor includes an ambient light sensor and a proximity sensor, where the ambient light sensor can adjust brightness of the display panel 7061 based on brightness of ambient light, and the proximity sensor can turn off the display panel 7061 and/or backlight when the terminal 700 moves towards the ear. As a type of the motion sensor, an accelerometer sensor may detect magnitude of an acceleration in each direction (generally three axes), and may detect magnitude and a direction of gravity when being static. The accelerometer sensor may be used for recognizing terminal gesture (for example, horizontal and vertical screen switching, a related game, or magnetometer posture calibration), a function related to vibration recognition (for example, a pedometer or a strike), or the like. The sensor 705 may further include a fingerprint sensor, a pressure sensor, an iris sensor, a molecular sensor, a gyroscope, a barometer, a hygrometer, a thermometer, an infrared sensor, and the like. This is not described herein again.

The display unit 706 is configured to display information entered by the user or information provided for the user. The display unit 706 may include a display panel 7061, and the display panel 7061 may be configured in a form of a liquid crystal display (Liquid Crystal Display, LCD), an organic light-emitting diode (Organic Light-Emitting Diode, OLED), or the like.

The user input unit 707 can be configured to receive input numeric or character information, and generate key signal inputs related to user settings and function control of the terminal. For example, the user input unit 707 includes a touch panel 7071 and another input device 7072. The touch panel 7071 is also referred to as a touchscreen, and may collect a touch operation performed by a user on or near the touch panel 7071 (such as an operation performed by a user on the touch panel 7071 or near the touch panel 7071 by using any proper object or accessory, such as a finger or a stylus). The touch panel 7071 may include two parts: a touch detection apparatus and a touch controller. The touch detection apparatus detects a touch position of the user, detects a signal brought by the touch operation, and transmits the signal to the touch controller. The touch controller receives touch information from the touch detection apparatus, converts the touch information into contact coordinates, transmits the contact coordinates to the processor 710, receives a command sent by the processor 710, and executes the command. In addition, the touch panel 7071 may be implemented by using a plurality of types such as a resistive type, a capacitive type, an infrared ray, and a surface acoustic wave. The user input unit 707 may include another input device 7072 in addition to the touch panel 7071. For example, the another input device 7072 may include but is not limited to a physical keyboard, a function key (such as a volume control key or an on/off key), a trackball, a mouse, a joystick, and the like. Details are not described herein again.

Further, the touch panel 7071 may cover the display panel 7061. After detecting the touch operation on or near the touch panel 7071, the touch panel 7071 transmits the touch operation to the processor 710 to determine a type of a touch event, and then the processor 710 provides corresponding visual output on the display panel 7061 based on the type of the touch event. In FIG. 7, the touch panel 7071 and the display panel 7061 are used as two independent components to implement input and output functions of the terminal. However, in some embodiments, the touch panel 7071 and the display panel 7061 may be integrated to implement the input and output functions of the terminal. This is not specifically limited herein.

The interface unit 708 is an interface connecting an external apparatus to the terminal 700. For example, the external apparatus can include a wired or wireless headphone port, an external power supply (or a battery recharger) port, a wired or wireless data port, a memory card port, a port for connection with an apparatus having an identification module, an audio input/output (I/O) port, a video I/O port, an earphone port, and the like. The interface unit 708 may be configured to receive an input (for example, data information and power) from an external apparatus and transmit the received input to one or more elements within the terminal 700, or may be configured to transmit data between the terminal 700 and the external apparatus.

The memory 709 may be configured to store software programs and various data. The memory 709 may mainly include a program storage area and a data storage area. The program storage area may store an operating system, an application program required by at least one function (such as a sound play function or an image play function), and the like. The data storage area may store data (such as audio data or an address book) created based on use of the mobile phone, and the like. In addition, the memory 709 may include a high-speed random access memory, and may further include a non-volatile memory such as at least one magnetic disk storage component, a flash memory component, or another volatile solid-state storage component.

The processor 710 is a control center of the terminal, and connects all parts of the entire terminal by using various interfaces and lines. By running or executing a software program and/or a module stored in the memory 709 and invoking data stored in the memory 709, the processor 710 performs various functions of the terminal and data processing, to perform overall monitoring on the terminal. The processor 710 may include one or more processing units. Optionally, the processor 710 may be integrated with an application processor and a modem processor. The application processor mainly processes an operating system, a user interface, an application program, and the like, and the modem processor mainly processes wireless communication. It may be understood that the modem processor may not be integrated into the processor 710.

The terminal 700 may further include a power supply 711 (for example, a battery) that supplies power to various components. Optionally, the power supply 711 may be logically connected to the processor 710 through a power supply management system, to perform functions of managing charging, discharging, and power consumption through the power supply management system.

In addition, the terminal 700 includes some function modules not shown, and details are not described herein again.

Optionally, an embodiment of the present disclosure further provides a terminal, including a processor 710, a memory 709, and a program stored in the memory 709 and executable on the processor 710, where the program, when executed by the processor 710, implements the processes of the foregoing embodiments of the access control method, and the same technical effects can be achieved. To avoid repetition, details are not described herein again.

An embodiment of the present disclosure further provides a non-transitory computer readable storage medium. The non-transitory computer readable storage medium stores a program, the program, when executed by a processor, implements the processes of the foregoing embodiments of the access control method, and same technical effects can be achieved. To avoid repetition, details are not described herein again. The non-transitory computer readable storage medium includes a read-only memory (Read-Only Memory, ROM for short), a random access memory (Random Access Memory, RAM for short), a magnetic disk, an optical disc, or the like.

Figure 8:
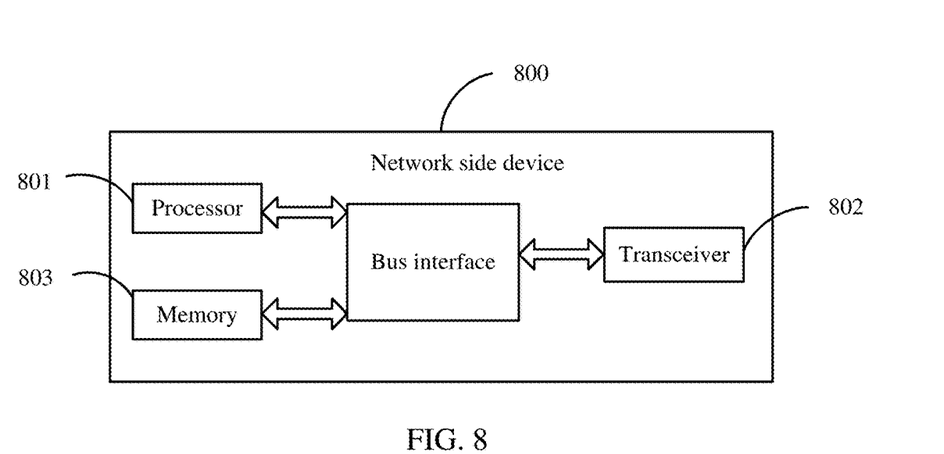
FIG. 8 is a third structural diagram of a network side device according to an embodiment of the present disclosure.

Referring to FIG. 8, FIG. 8 is a structural diagram of a network side device according to an embodiment of the present disclosure. As shown in FIG. 8, a network side device 800 includes a processor 801, a transceiver 802, a memory 803, and a bus interface.

The transceiver 802 is configured to:

send network side access association information, where the network side access association information includes first information, and the first information indicates a bandwidth of an initial bandwidth part of a target cell, or a bandwidth of a default bandwidth part, or a bandwidth of a first activated bandwidth part.

Optionally, the network side access association information further includes access assistance information, and the access assistance information includes at least one of the following information:

second information, indicating whether a cell allows access by the terminal that does not support the bandwidth of the initial bandwidth part, or the bandwidth of the default bandwidth part, or the bandwidth of the first activated bandwidth part;

third information, indicating whether the cell supports flexible scheduling limitation;

fourth information, indicating a minimum bandwidth supported by the cell; and fifth information, indicating that when the terminal does not support the bandwidth of the initial bandwidth part of the cell, or the bandwidth of the default bandwidth part, or the bandwidth of the first activated bandwidth part, forbidding access to the cell.

Optionally, the transceiver 802 is further configured to:

receive terminal side access association information sent by a terminal when a third predetermined condition or a fourth predetermined condition is met;

that the third predetermined condition is met includes: the terminal does not support the bandwidth of the initial bandwidth part, or the bandwidth of the default bandwidth part, or the bandwidth of the first activated bandwidth part; and the second information or the third information indicates "no"; or the terminal does not support the bandwidth of the initial bandwidth part, or the bandwidth of the default bandwidth part, or the bandwidth of the first activated bandwidth part; and the terminal does not support a minimum bandwidth part indicated by the fourth information; and that the fourth predetermined condition is met includes: the terminal does not support the bandwidth of the initial bandwidth part, or the bandwidth of the default bandwidth part, or the bandwidth of the first activated bandwidth part.

Optionally, the transceiver 802 is further configured to:

send access indication information, where the access indication information is determined by the network side based on the terminal side access association information, and indicates whether to allow the terminal to access.

Optionally, the terminal side access association information includes at least one of the following information:

sixth information, indicating bandwidth information supported by the terminal;

seventh information, indicating whether the terminal supports the minimum bandwidth part of the cell; and eighth information, indicating whether the terminal supports the bandwidth of the initial bandwidth part of the cell, or the bandwidth of the default bandwidth part, or the bandwidth of the first activated bandwidth part.

In FIG. 8, a bus architecture may include any quantity of interconnected buses and bridges, which are specifically connected together by one or more processors represented by the processor 801 and various circuits of a memory represented by the memory 803. The bus architecture may further link various other circuits such as a peripheral device, a voltage regulator, and a power management circuit together. These are all well-known in the art, and therefore are not further described in this specification. The bus interface provides an interface. The transceiver 802 may include a plurality of elements, that is, include a transmitter and a receiver, and provide units for communication with various other apparatuses on a transmission medium. For different user equipment, the user interface 804 may alternatively be an interface for externally and internally connecting required equipment. The connected equipment includes but is not limited to a keypad, a display, a speaker, a microphone, a joystick, and the like.

The processor 801 is responsible for managing the bus architecture and common processing, and the memory 803 may store data used when the processor 801 performs an operation.

It should be noted that the network side device 800 in this embodiment may be a network side device in any implementation in the method embodiments in the embodiments of the present disclosure. Any implementation of the network side device in the method embodiments in the embodiments of the present disclosure may be implemented by the network side device 800 in this embodiment, and a same beneficial effect is achieved. To avoid repetition, details are not described herein again.

An embodiment of the present disclosure further provides a non-transitory computer readable storage medium. The non-transitory computer readable storage medium stores a program, the program, when executed by a processor, implements the processes of the foregoing embodiments of the access control method corresponding to the network side device, and same technical effects can be achieved. To avoid repetition, details are not described herein again. The non-transitory computer readable storage medium includes a read-only memory (Read-Only Memory, ROM for short), a random access memory (Random Access Memory, RAM for short), a magnetic disk, an optical disc, or the like.

A network side device provided in another embodiment of the present disclosure provides a network side device, including a processor 801, a transceiver 802, a memory 803, and a bus interface.

The transceiver 802 is configured to receive an access request sent by a terminal.

The processor 801 is configured to schedule the terminal according to a target bandwidth part, where a bandwidth of the target bandwidth part is: a bandwidth of a bandwidth part supported by a capability of the terminal, or a bandwidth of a minimum bandwidth part supported by a system, or a bandwidth of an initial bandwidth part of the cell, or a bandwidth of a default bandwidth part, or a bandwidth of a first activated bandwidth part.

Optionally, the scheduling, by the processor 801, the terminal according to a target bandwidth part may be:

before capability information of the terminal is obtained, scheduling the terminal according to the bandwidth of the minimum bandwidth part supported by the system; or after capability information of the terminal is obtained, scheduling the terminal according to a bandwidth of a bandwidth part supported by the capability of the terminal.

An embodiment of the present disclosure further provides a non-transitory computer-readable storage medium, the non-transitory computer-readable storage medium stores a program, and when the program is executed by a processor, processes of embodiments of the foregoing access control method corresponding to network side device may be implemented, and a same technical effect can be achieved. To avoid repetition, details are not described herein. The non-transitory computer readable storage medium includes a read-only memory (Read-Only Memory, ROM for short), a random access memory (Random Access Memory, RAM for short), a magnetic disk, an optical disc, or the like.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. In the absence of more restrictions, an element defined by the statement "including a . . . " does not exclude another same element in a process, method, article, or apparatus that includes the element.

According to the foregoing descriptions of the implementations, a person skilled in the art may clearly understand that the foregoing methods in the embodiments may be implemented by using software and a required universal hardware platform, or certainly may be implemented by using hardware. However, in many cases, the former is a better implementation. Based on such an understanding, the technical solutions of the present disclosure essentially or the part contributing to the related art may be implemented in a form of a software product. The computer software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of the present disclosure.

The embodiments of the present disclosure are described above with reference to the accompanying drawings, but the present disclosure is not limited to the foregoing specific implementations. The foregoing specific implementations are merely exemplary instead of restrictive. Under enlightenment of the present disclosure, a person of ordinary skills in the art may make many forms without departing from the aims of the present disclosure and the protection scope of claims, all of which fall within the protection of the present disclosure.

What is claimed is:

1. An access control method, applied to a terminal, comprising:
receiving network side access association information sent by a network side, wherein the network side access association information comprises first information, and the first information indicates a bandwidth of an initial bandwidth part of a target cell, or a bandwidth of a default bandwidth part, or a bandwidth of a first activated bandwidth part; and when the terminal does not support the bandwidth of the initial bandwidth part, or the bandwidth of the default bandwidth part, or the bandwidth of the first activated bandwidth part, performing access control processing on the target cell according to the network side access association information; wherein the network side access association information further comprises access assistance information, and the access assistance information comprises at least one of:
second information, indicating whether a cell allows access by the terminal that does not support the bandwidth of the initial bandwidth part, or the bandwidth of the default bandwidth part, or the bandwidth of the first activated bandwidth part;
third information, indicating whether the cell supports flexible scheduling limitation;
fourth information, indicating a minimum bandwidth supported by the cell; or
fifth information, indicating that when the terminal does not support the bandwidth of the initial bandwidth part of the cell, or the bandwidth of the default bandwidth part, or the bandwidth of the first activated bandwidth part, forbidding access to the cell; wherein the performing access control processing on the target cell according to the network side access association information comprises:
when the second information or the third information indicates "no", forbidding access to the target cell; or
when the terminal does not support a minimum bandwidth indicated by the fourth information, forbidding access to the target cell; or
when the second information or the third information indicates "no", or the terminal does not support the minimum bandwidth part indicated by the fourth information, sending the terminal side access association information; or
when a first preset condition is met, sending the terminal side access association information, wherein that the first preset condition is met comprises that: the second information or the third information indicates "no" and the enabling indication sent by the network side is allowing; or the terminal does not support the minimum bandwidth part indicated by the fourth information and the enabling indication sent by the network side is allowing; or
when the second information or the third information indicates "no", or the terminal does not support the minimum bandwidth part indicated by the fourth information, sending terminal side access association information; receiving access indication information determined by the network side based on the terminal side access association information; and when the access indication information indicates rejecting access by the terminal, forbidding access to the target cell; or
when a second preset condition is met, sending terminal side access association information; receiving access indication information determined by the network side based on the terminal side access association information; and when the access indication information indicates rejecting access by the terminal, forbidding access to the target cell, and wherein the second preset condition being met comprises that: the second information or the third information indicates "no" and the enabling indication sent by the network side is allowing; or the terminal does not support the minimum bandwidth part indicated by the fourth information and the enabling indication sent by the network side is allowing.

2. The access control method according to claim 1, wherein the terminal side access association information comprises at least one of:
sixth information, indicating bandwidth information supported by the terminal;
seventh information, indicating whether the terminal supports the minimum bandwidth part of the cell; or
eighth information, indicating whether the terminal supports the bandwidth of the initial bandwidth part of the cell, or the bandwidth of the default bandwidth part, or the bandwidth of the first activated bandwidth part.

3. A non-transitory computer readable storage medium, wherein the non-transitory computer readable storage medium stores a program, and when the program is executed by a processor, steps of the access control method according to claim 2 are performed.

4. The access control method according to claim 1, wherein the forbidding access to the target cell comprises at least one of:
forbidding access to the target cell in a preset time;
forbidding access to an intra-frequency cell of the target cell;
forbidding access to an intra-frequency cell of the target cell in a preset time;
adding the target cell to a cell blacklist list;
adding the target cell to a cell blacklist list in a preset time; or
deleting the target cell from a neighboring cell list.

5. A non-transitory computer readable storage medium, wherein the non-transitory computer readable storage medium stores a program, and when the program is executed by a processor, steps of the access control method according to claim 4 are performed.

6. The access control method according to claim 4, wherein the preset time is different from duration that is broadcasted by system information and in which access to the cell is forbidden.

7. A non-transitory computer readable storage medium, wherein the non-transitory computer readable storage medium stores a program, and when the program is executed by a processor, steps of the access control method according to claim 1 are performed.

8. An access control method, applied to a network side device, the access control method comprising:
sending network side access association information, wherein the network side access association information comprises first information, and the first information indicates a bandwidth of an initial bandwidth part of a target cell, or a bandwidth of a default bandwidth part, or a bandwidth of a first activated bandwidth part; wherein
the network side access association information further comprises access assistance information, and the access assistance information comprises at least one of:
second information, indicating whether a cell allows access by the terminal that does not support the bandwidth of the initial bandwidth part, or the bandwidth of the default bandwidth part, or the bandwidth of the first activated bandwidth part;
third information, indicating whether the cell supports flexible scheduling limitation;
fourth information, indicating a minimum bandwidth part supported by the cell; or
fifth information, indicating that when the terminal does not support the bandwidth of the initial bandwidth part of the cell, or the bandwidth of the default bandwidth part, or the bandwidth of the first activated bandwidth part, forbidding access to the cell; wherein
after the sending the network side access association information, the access control method further comprises:
receiving terminal side access association information sent by a terminal when a third predetermined condition or a fourth predetermined condition is met; wherein the third predetermined condition being met comprises that:
the terminal does not support the bandwidth of the initial bandwidth part, or the bandwidth of the default bandwidth part, or the bandwidth of the first activated bandwidth part; and the second information or the third information indicates "no"; or
the terminal does not support the bandwidth of the initial bandwidth part, or the bandwidth of the default bandwidth part, or the bandwidth of the first activated bandwidth part; and the terminal does not support a minimum bandwidth part indicated by the fourth information; and
the fourth predetermined condition being met comprises that: the terminal does not support the bandwidth of the initial bandwidth part, or the bandwidth of the default bandwidth part, or the bandwidth of the first activated bandwidth part; wherein
after the receiving terminal side access association information sent by a terminal when a third predetermined condition or a fourth predetermined condition is met, the access control method further comprises:
sending access indication information, wherein the access indication information is determined by the network side based on the terminal side access association information, and indicates whether to allow the terminal to access.

9. The access control method according to claim 8, wherein the terminal side access association information comprises at least one of:
sixth information, indicating bandwidth information supported by the terminal;
seventh information, indicating whether the terminal supports the minimum bandwidth part of the cell; or
eighth information, indicating whether the terminal supports the bandwidth of the initial bandwidth part of the cell, or the bandwidth of the default bandwidth part, or the bandwidth of the first activated bandwidth part.

10. A network side device, comprising: a memory, a processor, and a program stored in the memory and executable on the processor, wherein when the program is executed by the processor, steps of the access control method according to claim 9 are performed.

11. A non-transitory computer readable storage medium, wherein the non-transitory computer readable storage medium stores a program, and when the program is executed by a processor, steps of the access control method according to claim 9 are performed.

12. A network side device, comprising: a memory, a processor, and a program stored in the memory and executable on the processor, wherein when the program is executed by the processor, steps of the access control method according to claim 8 are performed.

13. A non-transitory computer readable storage medium, wherein the non-transitory computer readable storage medium stores a program, and when the program is executed by a processor, steps of the access control method according to claim 8 are performed.

14. A terminal, comprising: a memory, a processor, and a program stored in the memory and executable on the processor, wherein the program, when executed by the processor, causes the processor to perform:
receiving network side access association information sent by a network side, wherein the network side access association information comprises first information, and the first information indicates a bandwidth of an initial bandwidth part of a target cell, or a bandwidth of a default bandwidth part, or a bandwidth of a first activated bandwidth part; and
when the terminal does not support the bandwidth of the initial bandwidth part, or the bandwidth of the default bandwidth part, or the bandwidth of the first activated bandwidth part, performing access control processing on the target cell according to the network side access association information; wherein
the network side access association information further comprises access assistance information, and the access assistance information comprises at least one of:
second information, indicating whether a cell allows access by the terminal that does not support the bandwidth of the initial bandwidth part, or the bandwidth of the default bandwidth part, or the bandwidth of the first activated bandwidth part;
third information, indicating whether the cell supports flexible scheduling limitation;
fourth information, indicating a minimum bandwidth supported by the cell; or
fifth information, indicating that when the terminal does not support the bandwidth of the initial bandwidth part of the cell, or the bandwidth of the default bandwidth part, or the bandwidth of the first activated bandwidth part, forbidding access to the cell; wherein
the processor performs:
when the second information or the third information indicates "no", forbidding access to the target cell; or
when the terminal does not support a minimum bandwidth indicated by the fourth information, forbidding access to the target cell; or
when the second information or the third information indicates "no", or the terminal does not support the minimum bandwidth part indicated by the fourth information, sending the terminal side access association information; or
when a first preset condition is met, sending the terminal side access association information, wherein that the first preset condition is met comprises that: the second information or the third information indicates "no" and the enabling indication sent by the network side is allowing; or the terminal does not support the minimum bandwidth part indicated by the fourth information and the enabling indication sent by the network side is allowing; or
when the second information or the third information indicates "no", or the terminal does not support the minimum bandwidth part indicated by the fourth information, sending terminal side access association information; receiving access indication information determined by the network side based on the terminal side access association information; and when the access indication information indicates rejecting access by the terminal, forbidding access to the target cell; or
when a second preset condition is met, sending terminal side access association information; receiving access indication information determined by the network side based on the terminal side access association information; and when the access indication information indicates rejecting access by the terminal, forbidding access to the target cell, wherein
the second preset condition being met comprises that: the second information or the third information indicates "no" and the enabling indication sent by the network side is allowing; or the terminal does not support the minimum bandwidth part indicated by the fourth information and the enabling indication sent by the network side is allowing.

15. The terminal according to claim 14, wherein the terminal side access association information comprises at least one of:
sixth information, indicating bandwidth information supported by the terminal;
seventh information, indicating whether the terminal supports the minimum bandwidth part of the cell; or
eighth information, indicating whether the terminal supports the bandwidth of the initial bandwidth part of the cell, or the bandwidth of the default bandwidth part, or the bandwidth of the first activated bandwidth part.

16. The terminal according to claim 14, wherein the forbidding access to the target cell comprises at least one of:
forbidding access to the target cell in a preset time;
forbidding access to an intra-frequency cell of the target cell;
forbidding access to an intra-frequency cell of the target cell in a preset time;
adding the target cell to a cell blacklist list;
adding the target cell to a cell blacklist list in a preset time; or
deleting the target cell from a neighboring cell list.

17. The access control method according to claim 16, wherein the preset time is different from duration that is broadcasted by system information and in which access to the cell is forbidden.

* * * * *